United States Patent [19]

Baermann

[11] 3,885,504

[45] May 27, 1975

[54] MAGNETIC STABILIZING OR SUSPENSION SYSTEM

[76] Inventor: Max Baermann, 506 Bensburg, Germany

[22] Filed: May 25, 1973

[21] Appl. No.: 363,988

Related U.S. Application Data

[63] Continuation-in-part of Ser. No. 181,523, Sept. 17, 1971, Pat. No. 3,791,309.

[30] Foreign Application Priority Data

Jan. 9, 1971 Germany.......................... 2100839

[52] U.S. Cl............................. 104/148 MS; 308/10
[51] Int. Cl............................................. B61b 13/08
[58] Field of Search ............. 335/306, 210; 308/10; 104/148 MS, 148 SS, 148 LM; 219/10.49

[56] References Cited
UNITED STATES PATENTS

| | | | |
|---|---|---|---|
| 1,020,943 | 3/1912 | Bachelet...................... | 104/148 MS |
| 3,158,765 | 11/1964 | Polgreen ...................... | 104/148 MS |
| 3,205,415 | 9/1965 | Seki et al......................... | 335/210 |
| 3,470,828 | 10/1969 | Powell, Jr. et al............. | 104/148 SS |
| 3,589,300 | 6/1971 | Wipf............................... | 104/148 SS |

*Primary Examiner*—M. Henson Wood, Jr.
*Assistant Examiner*—Reinhard J. Eisenzopf
*Attorney, Agent, or Firm*—Meyer, Tilberry & Body

[57] ABSTRACT

A magnetic stabilizing or suspension device includes a flat electrical conductor of non-magnetic material. A plurality of spaced-apart permanent magnets face the conductor across an air gap for producing eddy currents in the conductor during relative movement between the conductor and magnets. Each permanent magnet has opposite north and south poles. The magnets include outer pole faces lying in a plane facing the conductor. Alternate ones of the permanent magnets are reversely positioned so that the magnets present alternate north and south poles facing the conductor. Additional permanent magnets are positioned between the permanent magnets. The additional magnets are magnetized in a direction substantially perpendicular to the direction of magnetization of the permanent magnets. The additional permanent magnets have opposite pole faces which face the permanent magnets. The additional permanent magnets have a thickness not greater than one-half the thickness of the permanent magnets. The outer surfaces of the additional magnets lie in substantially the same plane with the outer pole surfaces of the permanent magnets. The additional permanent magnets span the spaces between the permanent magnets and have pole faces which face poles of like polarity on the permanent magnets.

20 Claims, 9 Drawing Figures

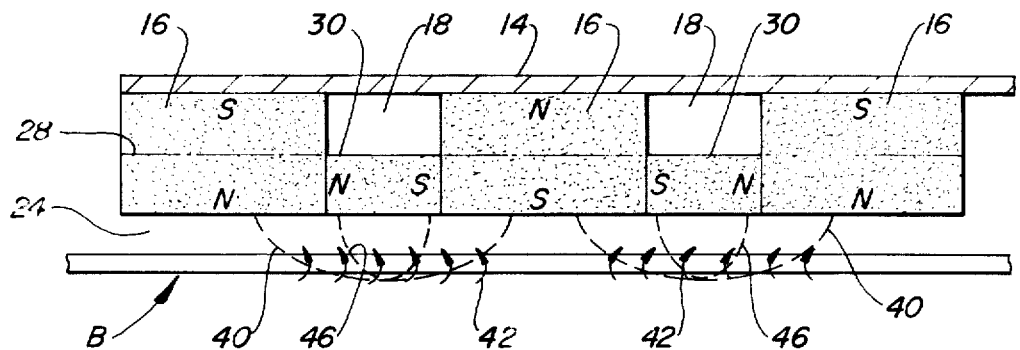
FIG. 4
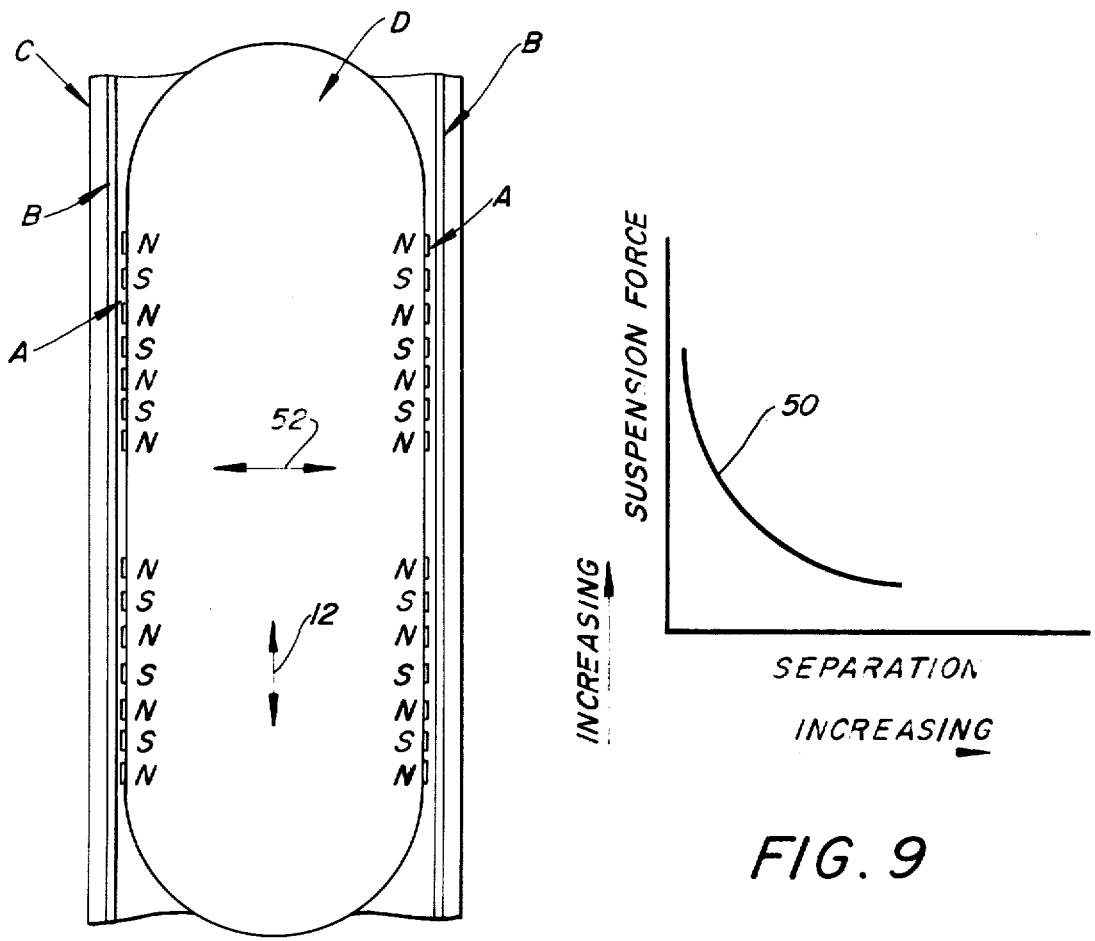
FIG. 5
FIG. 9

MAGNETIC STABILIZING OR SUSPENSION SYSTEM

This application is a continuation-in-part of copending U.S. Pat. application, Ser. No. 181,523, filed Sept. 17, 1971, now U.S. Pat. No. 3,791,309 issued Feb. 12, 1974.

BACKGROUND OF THE INVENTION

This application pertains to the art of magnetic levitation. The invention is particularly applicable to stabilizing or suspending a moving vehicle relative to a support and will be particularly described with reference thereto. However, it will be appreciated that the invention has broader applications and may be used for other stabilizing or suspension purposes.

My earlier application relates to a magnetic levitation system for guiding and suspending a vehicle relative to a track. The earlier system includes elongated rows of main permanent magnets attached to the vehicle and to the track. The main permanent magnets on both the vehicle and track extend parallel to the direction in which the vehicle moves. The rows of permanent magnets on the vehicle and on the tracks are spaced apart laterally to the direction in which the vehicle moves. The magnets on the vehicle and track have pole faces of common polarity facing one another so that the vehicle is suspended relative to the track by magnetic repulsion forces. Additional permanent magnets are positioned in the spaces between the rows of main permanent magnets. These additional magnets are magnetized transversely to the direction of vehicle motion to have opposite magnetic poles facing the rows of permanent magnets. Common poles on the rows of main permanent magnets and on the additional magnets face one another. The rows of main permanent magnets have a substantially neutral zone where the south and north poles separate. The additional magnets are made to have a thickness which is substantially equal to one-half the thickness of the magnets in the rows. In addition, the additional permanent magnets are positioned with their outer surfaces lying in a substantially common plane with the outer pole faces of the magnets in the rows. With this arrangement, the additional permanent magnets are not short circuited and their opposite pole faces completely face poles of like polarity on the main magnet rows. The additional permanent magnets prevent compression of the lines of magnetic force into the spaces between the rows of main permanent magnets. The additional permanent magnets provide additional magnetic forces which maintain the lines of magnetic force interacting completely within the air gap to greatly increase the available suspension force. This makes it possible to use smaller magnets and a lesser number of magnets in order to achieve the same suspension force.

My earlier application also relates to an improved arrangement for limiting lateral movement of the vehicle relative to the track. Magnetic lateral stabilizing means is provided to limit lateral movement of the vehicle within a predetermined maximum distance. The rows of main permanent magnets are spaced-apart a distance at least as great as the maximum lateral movement, and preferably a distance at least twice as great as the maximum lateral movement. With such an arrangement, poles of common polarity on the rows of main permanent magnets are always facing one another and do not move substantially closer to poles of unlike polarity whereby strong attractive forces would come into play.

The requirement of having permanent magnets on both the vehicle and track makes a very expensive system. Therefore, it would be desirable to have an arrangement whereby permanent magnets could be positioned only on the vehicle.

Prior magnetic levitation systems commonly use electromagnets for laterally stabilizing the vehicle. In the event of a failure in the current supply, such electro-magnetic stabilizing devices are inoperative and accidents can occur. It would be desirable to have an improved magnetic lateral stabilizing arrangement which would not require electro-magnets, or permanent magnets on the track.

SUMMARY OF THE INVENTION

A magnetic stabilizing or suspension system includes a substantially flat electrical conductor of non-magnetic material. That is, the electrical conductor is of a material such as aluminum having a very low magnetic permeability. A plurality of main permanent magnets face the conductor across an air gap for producing eddy currents in the conductor during relative movement between the conductor and main magnets.

The main magnets are spaced-apart parallel to the conductor, and each has opposite north and south poles. The main permanent magnets have outer pole faces lying in a plane facing the conductor. Alternate ones of the main permanent magnets are reversely positioned so that the magnets present alternate north and south pole facing the conductor across an air gap.

In accordance with a preferred arrangement, additional permanent magnets are positioned in the spaces between the main permanent magnets. The additional permanent magnets are magnetized substantially perpendicular to the direction of magnetization of the main permanent magnets. The additional magnets have opposite pole faces which face the main permanent magnets. The additional permanent magnets have a thickness not greater than one-half the thickness of the main permanent magnets, and have outer surfaces lying substantially in a common plane with the outer pole faces of the main magnets. The additional permanent magnets substantially span the spaces between the main permanent magnets. The pole faces on the additional permanent magnets face poles of like polarity on the main permanent magnets.

During relative movement between the magnets and the conductor, eddy currents are generated in the conductor to establish a magnetic field opposite to the magnetic field of the permanent magnets. These opposing fields repulse one another. The additional permanent magnets minimize compression of the lines of magnetic force into the spaces between the main permanent magnets. The additional permanent magnets maintain the lines of magnetic force within the air gap for optimum repulsive action.

In accordance with one arrangement, the magnetic stabilizing or suspension system is used for maintaining a vehicle in spaced relationship to a support over which the vehicle moves in a predetermined direction. The plurality of permanent magnets are fixed to the vehicle and are spaced-apart in the predetermined direction in which the vehicle moves. The electrical conductor comprises an elongated flat electrical conductor strip attached to the support in opposed relationship to the magnets.

The magnets and electrical conductor may be positioned for laterally stabilizing the vehicle or for suspending the vehicle, or both.

In one arrangement, the permanent magnets are arranged on opposite sides of the vehicle and face electrical conductor strips across air gaps extending transversely to the predetermined direction of motion of the vehicle. This arrangement laterally stabilizes the vehicle for holding it substantially along a straight course as it travels over the support. With such a stabilizing arrangement, the vehicle may be suspended over the support in any desired manner. For example, the vehicle could be suspended by air pressure or by another magnetic levitation system. In addition, the vehicle may be suspended by the magnetic levitation system of the present invention.

The vehicle may be driven over the support by a jet engine; by a linear motor; or by a friction drive.

It is a principal object of the present invention to provide an improved magnetic levitation system.

It is an additional object of the present invention to provide an improved magnetic repulsion system for laterally stabilizing a vehicle.

It is a further object of the present invention to provide a magnetic stabilizing or suspension system which is less expensive.

It is also an object of the present invention to provide a magnetic stabilizing or suspension system in which small magnets can be used, while maximizing the repulsive force.

BRIEF DESCRIPTION OF THE DRAWING

The invention may take form in certain parts and arrangements of parts, a preferred embodiment of which will be described in detail in this specification and illustrated in the accompanying drawing which forms a part hereof.

FIG. 4 is a side elevational view of a magnet system constructed in accordance with the present invention and showing how repulsive force is maximized;

FIG. 5 is a plan view showing how the magnetic system of the present invention is arranged for laterally stabilizing a vehicle;

DESCRIPTION OF A PREFERRED EMBODIMENT

Figure 1:
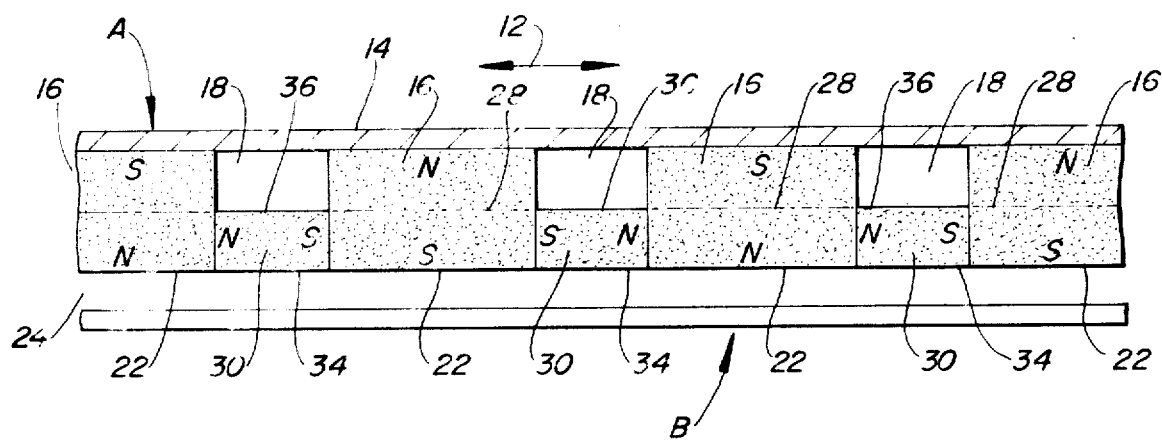
FIG. 1 is a side elevational view showing the improved magnetic arrangement of the present invention.

Referring now to the drawings, wherein the showings are for purposes of illustrating a preferred embodiment of the invention only and not for purposes of limiting same, FIG. 1 shows an improved magnetic stabilizing or suspension system A constructed in accordance with the present invention. The suspension system A includes a flat elongated electrical conductor B of nonmagnetic material. Conductor B is preferably of a material having a very low magnetic permeability, such as aluminum or the like. Conductor B is adapted to be secured to a support over which a vehicle travels in the direction indicated by arrows 12. Conductor B extends parallel to the direction of motion indicated by arrows 12. A yoke member 14 is adapted to be secured to a vehicle. Yoke member 14 is of a material having a very high magnetic permeability, such as soft iron or the like.

A plurality of small rectangular main permanent magnets 16 are secured to yoke member 14 in spaced-apart relationship. Main permanent magnets 16 are spaced-apart by spaces 18 in a direction parallel to arrows 12. That is, main permanent magnets 16 are spaced-apart in the predetermined direction of vehicle motion.

Main permanent magnets 16 are magnetized perpendicular to the direction of vehicle motion indicated by arrows 12, and perpendicular to conductor B and yoke member 14. This provides main permanent magnets 16 with opposite poles indicated by the letters N and S. Alternate ones of main permanent magnets 16 are reversely positioned so that main permanent magnets 16 present alternate north and south poles facing electrical conductor B. Magnets 16 have flat outer pole faces 22 of alternating polarity lying in a substantially common plane extending substantially parallel to conductor B and spaced therefrom across an air gap 24.

Main permanent magnets 16 have neutral axes indicated by center lines 28. Neutral axes 28 are located centrally between the opposite flat faces of main permanent magnets 16. Neutral axes 28 define the zone of demarcation between the opposite north and south poles.

A plurality of generally rectangular additional permanent magnets 30 are positioned in spaces 18 between main permanent magnets 16. Additional permanent magnets 30 have a width perpendicular to the plane of the paper which is the same as the width of main permanent magnets 16. Additional permanent magnets 30 have a thickness perpendicular to yoke 14 and conductor B which is not greater than one-half the thickness of main permanent magnets 16. Outer flat faces 34 of additional permanent magnets 30 lie in a common plane with outer surfaces 22 of main permanent magnets 16. Additional permanent magnets 30 are magnetized perpendicular to the direction of magnetization of main permanent magnets 16 and parallel to the direction of vehicle motion indicated by arrows 12. This provides additional permanent magnets 30 with opposite north and south poles indicated by letters N and S. Opposite poles N and S on additional permanent magnets 30 face generally parallel to arrows 12.

With the arrangement described, opposite faces 36 of additional permanent magnets 30 do not extend above neutral zones 28 of main permanent magnets 16. Extension of additional permanent magnets 30 above neutral zone 28 would short circuit main permanent magnets 16. Additional permanent magnets 30 completely span spaces 18 between main permanent magnets 16 and have opposite pole faces contacting main permanent magnets 16. Additional permanent magnets 30 are positioned so that common magnetic poles on main permanent magnets 16 and additional permanent magnets 30 face one another. That is, the north pole on additional magnets 30 face the north pole on main permanent magents 16, and the south pole on additional permanent magnets 30 faces the south pole on main permanent magnets 16.

Figure 2:
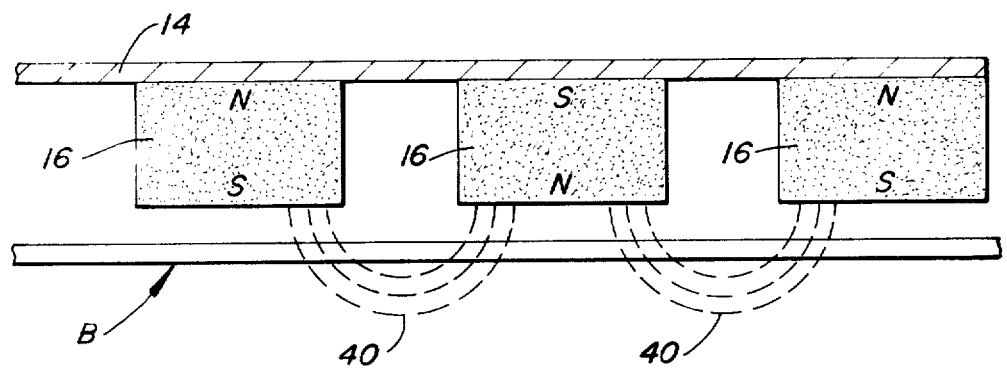
FIG. 2 is a side elevational view showing generally how the lines of flux pass between adjacent magnets.
Figure 3:
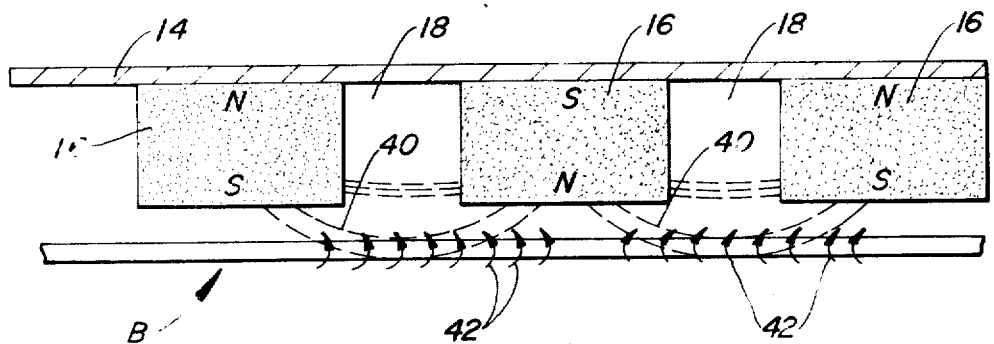
FIG. 3 is a side elevational view showing how lines of magnetic force are compressed during operation of a magnetic stabilizing or suspension system.

FIG. 2 shows lines of magnetic force 40 extending between adjacent main permanent magnets 16. Air gap 24 is such that lines 40 of magnetic force intersect and cut through electrical conductor B. During movement of the vehicle in the direction of arrows 12, lines of magnetic force 40 cutting through conductor B and moving relative thereto establishes eddy currents flowing through conductor B perpendicular to the plane of the paper. The eddy currents in conductor B establish opposite magnetic fields generally indicated by arrows 42 in FIG. 3 which oppose lines of magnetic force 40. These opposing magnetic forces repulse one another for suspending a vehicle relative to conductor B. As shown in FIG. 3, the repulsive force between lines of magnetic force 40 and 42 compresses lines of magnetic force 40 so that they extend into spaces 18 between adjacent magnets 16. These lines of magnetic force then contribute virtually nothing to the repulsive force. The available repulsive force and the generation of eddy currents are thereby greatly reduced by compression of lines of magnetic force 40 into space 18.

As shown in FIG. 4, additional permanent magnets 30 prevent compression of lines of magnetic force 40 into spaces 18. Thus, the maximum lines of magnetic force always repulse one another in air gap 24. Additional permanent magnets 30 provide additional lines of magnetic force 46 which maintain lines of magnetic force 40 interacting substantially completely within air gap 24 to greatly increase the available suspension force. In addition, it is important to maintain lines of magnetic force 40 out of spaces 18 so that they will be cutting through conductor B to establish high eddy currents. In the arrangement shown in FIG. 3, compression of lines of magnetic force 40 reduces the lines of magnetic force cutting through conductor B and greatly reduces the eddy current flowing through conductor B. This greatly reduces opposite magnetic forces 42 so that the available suspension force is further reduced.

With the arrangement described using additional magnets 30, it is possible to obtain an extremely high suspension force while using a considerably lesser number of permanent magnets than in systems not having the additional permanent magnets.

In a preferred arrangement, additional permanent magnets 30 have a higher coercivity than main permanent magnets 16. This enables spaces 18 between adjacent main permanent magnets 16 to be as small as possible. In addition, the length necessary for additional permanent magnets 30 to span spaces 18 is then kept as small as possible. Using additional permanent magnets 30 of a very high coercivity also minimizes demagnetization thereof.

The available repulsive force is maintained as high as possible by minimizing air gap 24 as shown in FIG. 9. Increasing separation distance is plotted from left to right on the abscissa of the graph in FIG. 9. Increasing suspension force is plotted from bottom to top on the ordinate of the graph. Curve 50 shows that the suspension force is very high with small air gaps.

The magnetic system described may be used for laterally stabilizing a vehicle or for suspending a vehicle, or both. FIG. 5 shows electrical conductors B positioned substantially vertically on support C. Magnetic systems A of the type described are mounted on the sides of a vehicle D facing conductors B. The two systems repulse one another for maintaining lateral stabilization of vehicle D in the direction of arrow 52 as it moves in the direction of arrows 12.

Figure 6:
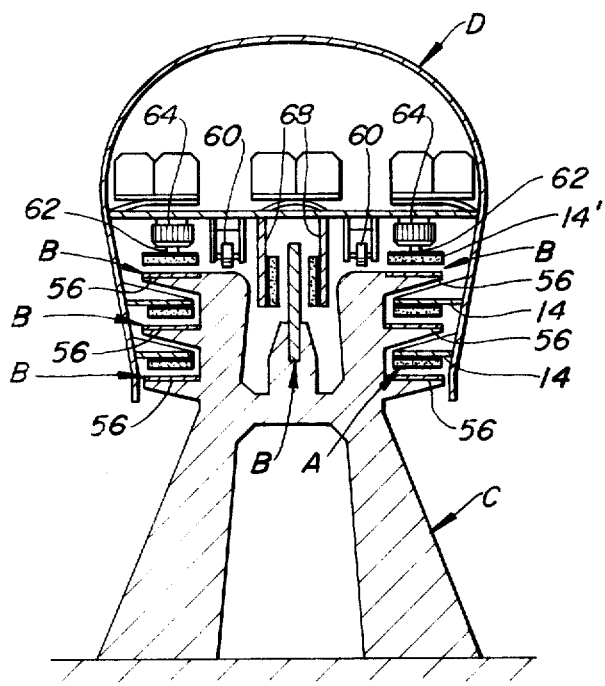
FIG. 6 is a cross-sectional elevational view showing a vehicle stabilized and suspended relative to a support by the improved magnet system of the present invention.

The magnetic suspension system described may be used in various arrangements. FIG. 6 shows vehicle D positioned for movement along supports C. Supports C may be concrete pillars or the like. In the arrangement shown, supports C have a plurality of opposite outwardly extending vertically spaced support portions 56 each having a flat elongated conductor B mounted on the upper surfaces thereof. Vehicle D has a plurality of inwardly extending vertically spaced yoke members 14 with magnetic systems A thereon facing conductors B across air gaps 24. This arrangement suspends vehicle D relative to support C as it travels thereon. When the speed of vehicle D drops below around 37 miles per hour, the magnetic suspension forces are not sufficient to maintain suspension. Therefore, vehicle D may have hydraulically or mechanically raisable and lowerable wheels 60 thereon for supporting vehicle D relative to support C. In addition, or in the alternative, circular disc yoke member 14' may be positioned on rotatable shafts 62 connected with electric motors 64 above uppermost electrical conductor B. The magnetic system described with respect to FIG. 1 would then be circumferentially arranged on circular disc yokes 14'. An arrangement for positioning such a magnetic system for rotation is described in more detail in U.S. Pat. No. 3,272,956 issued Sept. 13, 1966. Said patent is hereby incorporated herein by reference. At low vehicle speeds, motor 64 may be energized to rotate circular yokes 14' and the magnets thereon relative to uppermost electrical conductor B for producing eddy currents in uppermost conductor B and provide a very high repulsive force to suspend vehicle D when it is at rest or moving at low speeds. Such rotatable magnetic systems may be provided in addition to wheels 60 or by themselves.

In a system of the type described, when vehicle D travels at extremely high velocity relative to support C, lateral stabilization must be achieved in order to prevent pendulum action of vehicle D and to prevent contact thereof transversely to the direction of motion. In accordance with one arrangement, a flat electrical conductor B is positioned vertically and centrally located on support C. Vertically positioned support members 68 support magnetic systems A on opposite sides of vertically positioned conductor B. The magnetic repulsion produced between vertically positioned conductor B and vertically arranged magnetic systems A maintains vehicle D centrally located relative to support C. This lateral stabilization system is extremely efficient in operation. As vehicle D tends to move laterally in one direction, the magnetic repulsion in the opposite direction becomes greater for moving vehicle D back to its central location.

Figure 7:
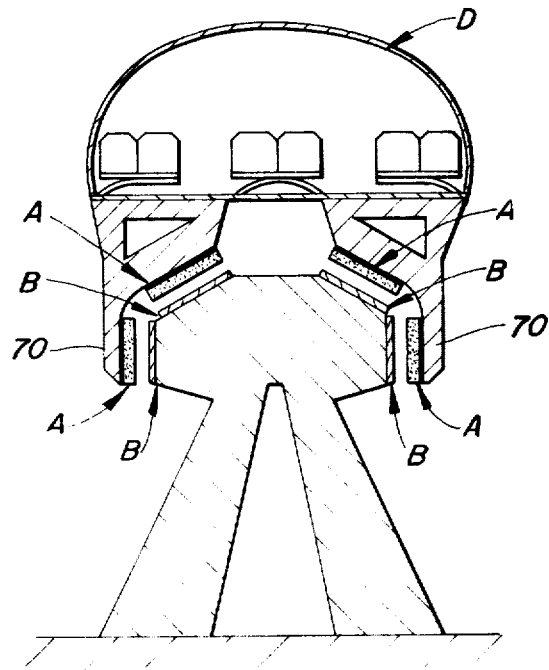
FIG. 7 is a cross-sectional elevational view showing another magnetic stabilizing and suspension arrangement.

Another arrangement is shown in FIG. 7 wherein support C has vertically positioned electrical conductors B facing outwardly thereof. Magnetic systems A of the type described extend along depending supports 70 on the lower opposite sides of vehicle D. This laterally stabilizes vehicle D during movement thereof relative to support C. Additional flat conductors B are located in inclined positions on upper surfaces of support C. The upper conductors also face magnet systems A of the type described for suspending vehicle D above support C. Additional rotary magnetic suspension systsms or wheels as described in FIG. 6 may also be provided in the arrangement of FIG. 7.

Figure 8:
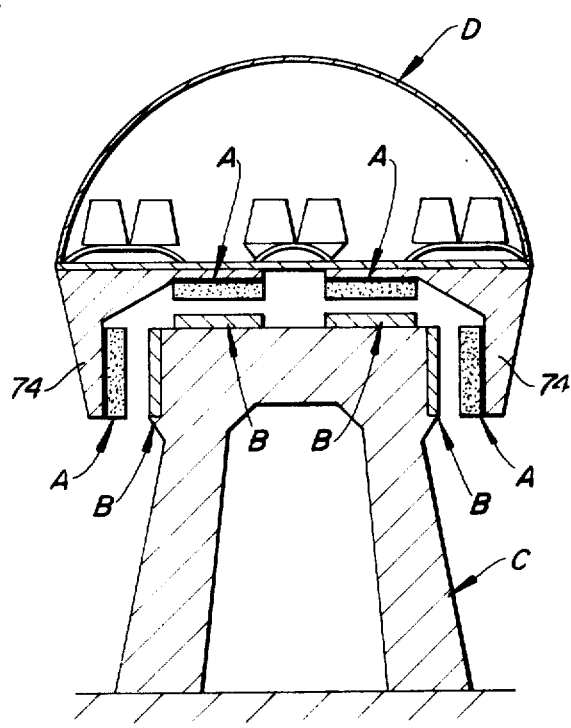
FIG. 8 is a cross-sectional elevational view showing another magnetic stabilizing and suspension arrangement; and, FIG. 9 is a graph showing how suspension force varies with varying air gaps.

FIG. 8 shows another arrangement wherein vehicle D has horizontally arranged magnet systems A facing conductors B located on the upper surfaces of support C for suspending the vehicle D relative to support C. Vehicle D has opposite depending members 74 having magnet systems A extending there-along facing conductors B on the outer surfaces of support C across horizontal air gaps for laterally stabilizing vehicle D.

It is obvious that many other arrangements of the magnetic suspension or stabilizing system may be provided. The magnetic system may be used only for laterally stabilizing a vehicle while some other type of suspension system is used. For example, the magnetic system of the present invention may be used for laterally stabilizing the vehicle while the vehicle is suspended relative to the support by a different magnetic system or by an air cushion. Also, the magnetic system of the present invention may be used alone as a suspension system while some other type of stabilizing system is used. In addition, the suspension system of the present invention may be used both as the suspension and lateral stabilizing arrangement.

The permanent magnets used in the system of the present invention should have a low permeability. The magnets may be made of permanent magnetic material such as barium-ferrite, strontium-ferrite, aluminum-manganese or rare earths. These materials have a relatively high energy product. Due to the low permeability of such materials, the lines of magnetic force are mainly leaving the magnets perpendicular to the outer pole surfaces thereof. This is particularly desirable in the present system for maintaining a high number of lines of magnetic force cutting through the electrical conductor to produce high eddy currents and high opposite lines of magnetic force. It is obvious that powdered permanent magnetic materials bound in plastic can be used with the present system.

Although the invention has been shown and described with respect to a preferred embodiment, it is obvious that equivalent alterations and modifications will occur to others skilled in the art upon the reading and understanding of this specification. The present invention includes all such equivalent alterations and modifications and is limited only by the scope of the claims.

Having thus described my invention, I claim:

1. In an arrangement for maintaining a vehicle in spaced relationship to an elongated support over which said vehicle moves in a predetermined direction said support including conductor means of non-magnetic material, the improvement which comprises; a plurality of small permanent magnets movable with said vehicle and spaced-apart in said predetermined direction a distance approximately equal to one half of their length in said direction, each of said magnets having opposite north and south poles and an axis of magnetization perpendicular to said support, alternate ones of said magnets being reversely positioned so that said magnets present alternate north and south poles facing said support, and a magnetically permeable member in engagement with the ends of said magnets remote from said support and bridging the spaces therebetween, said magnets having magnetic flux extending into said conductor means between adjacent poles of said magnets, whereby movement of said magnets with said vehicle in said predetermined direction relative to said conductor means produces eddy currents in said conductor means which establish magnetic fields opposite to the magnetic fields of said magnets and said fields repulse one another.

2. The arrangement of claim 1 wherein said permanent magnets have outer pole faces lying in a plane extending substantially parallel to said predetermined direction, said plane and said conductor means being substantially vertically spaced-apart.

3. The arrangement of claim 2 and further including a plurality of additional permanent magnets each positioned between a pair of said permanent magnets and being magnetized substantially parallel to said predetermined direction to have opposite pole faces facing said permanent magnets, said additional magnets having a thickness not greater than one-half the thickness of said permanent magnets and having outer surfaces lying substantially in said plane, said additional permanent magnets substantially spanning the spaces between said permanent magnets, and said pole faces on said additional permanent magnets facing poles of like polarity on said permanent magnets.

4. The arrangement of claim 1 wherein there are a plurality of rows of said plurality of permanent magnets and a plurality of said electrical conductors, certain of said rows and conductor means being substantially vertically spaced-apart for magnetically levitating said vehicle, and certain of said rows and conductors being substantially horizontally spaced-apart for laterally stabilizing said vehicle relative to said support.

5. The arrangement of claim 1 wherein there are at least two rows of said plurality of permanent magnets, and each of said rows face said conductor means across a substantially horizontal air gap for laterally stabilizing said vehicle relative to said support.

6. The arrangement of claim 5 wherein said permanent magnets have outer pole faces lying in a plane and further including additional permanent magnets positioned between said permanent magnets and being magnetized substantially parallel to said predetermined direction to have opposite pole faces facing said permanent magnets, said additional magnets having a thickness not greater than one-half the thickness of said permanent magnets and having outer surfaces lying substantially in said plane, said additional permanent magnets substantially spanning the spaces between said permanent magnets, and said pole faces on said additional magnets facing poles of like polarity on said permanent magnets.

7. The arrangement of claim 1 wherein said permanent magnets have outer pole faces lying in a plane and further including a plurality of additional permanent magnets each positioned between a pair of said permanent magnets and being magnetized substantially parallel to said predetermined direction to have opposite pole faces facing said permanent magnets, said additional magnets having a thickness not greater than one-half the thickness of said permanent magnets and having outer surfaces lying substantially in said plane, said additional permanent magnets substantially spanning the spaces between said permanent magnets, and said pole faces on said additional permanent magnets facing poles of like polarity on said permanent magnets.

8. The arrangement of claim 1 wherein said permanent magnets have outer pole faces lying in a plane extending substantially parallel to said predetermined direction, said plane and said conductor means being substantially horizontally spaced-apart.

9. The arrangement of claim 8 and further including a plurality of additional permanent magnets one positioned between a pair of said permanent magnets and being magnetized substantially parallel to said predetermined direction to have opposite pole faces facing said permanent magnets, said additional magnets having a thickness not greater than one-half the thickness of said permanent magnets and having outer surfaces lying substantially in said plane, said additional permanent magnets substantially spanning the spaces between said permanent magnets, and said pole faces on said additional permanent magnets facing poles of like polarity on said permanent magnets.

10. The arrangement of claim 8, including means for suspending said vehicle relative to the support.

11. The arrangement of claim 10, wherein said means comprise an air cushion.

12. The arrangement of claim 10, wherein said means comprise magnetic repulsion.

13. The arrangement of claim 10, wherein said means comprise nonmagnetic electrical conductor means on said support facing upwardly and a plurality of permanent magnets fixed to said vehicle, said magnets being spaced apart in said predetermined direction, each of said magnets having opposite north and south poles, alternate ones of said magnets being reversely positioned so that said magnets present alternate north and south poles facing said conductor means.

14. The arrangement of claim 10, wherein said suspension means includes a plurality of rows of permanent magnets on both said vehicle and said support extending parallel to the length of said support, said rows on said vehicle and on said support being of alternate magnetic polarity transversely of the length of said support and the polarity of the rows on the vehicle being of the same polarity as the rows on said support.

15. The arrangement of claim 14 wherein said rows are spaced and have vertical axes of magnetization and permanent magnets between each of said rows having a horizontal axis of magnetization generally transverse to the direction of motion.

16. The arrangement of claim 10 wherein said suspension means include upwardly facing electrical conductor means of nonmagnetic material on said support; a plurality of rotatable discs mounted on said vehicles, said discs having a ring of alternating polarity permanent magnets on the lower surface thereof facing said conductor means; and, power means for rotating said discs.

17. The arrangement of claim 10 wherein said supporting means includes a plurality of wheels on said vehicle arranged to engage a surface of said support.

18. The arrangement of claim 17 wherein means are provided for raising or lowering said wheels relative to said vehicle.

19. A permanent magnet suspension device including substantially flat electrical conductor means of nonmagnetic material, permanent magnet means facing said conductor means across an air gap for producing eddy currents in said conductor means during relative movement between said conductor means and said permanent magnet means, said permanent magnet means comprising a plurality of spaced-apart permanent magnets, each of said permanent magnets having opposite north and south poles and including outer pole faces lying in a plane facing said conductor means, alternate ones of said magnets being reversely positioned so that said magnets present alternate north and south poles facing said conductor means, additional permanent magnets positioned between said permanent magnets and being magnetized substantially perpendicular to the direction of magnetization of said permanent magnets, said additional permanent magnets having opposite pole faces facing said permanent magnets, said additional permanent magnets having a thickness not greater than one-half the thickness of said permanent magnet and having outer surfaces lying generally in said plane, said additional permanent magnets substantially spanning the spaces between said permanent magnets, and said pole faces on said additional permanent magnets facing poles of like polarity on said permanent magnets.

20. The device of claim 19 wherein said additional permanent magnets have a higher coercivity than said permanent magnets.

* * * * *